United States Patent [19]

Cosmi

[11] 4,091,721
[45] May 30, 1978

[54] PASTA-FILATA CHEESE MIXING AND STRETCHING MACHINE

[75] Inventor: Vincent Cosmi, Richmond, Vt.

[73] Assignee: Geraldine Z. DeStafeno, Hagerstown, Md.

[21] Appl. No.: 750,494

[22] Filed: Dec. 14, 1976

[51] Int. Cl.² ............................................. A23C 19/02
[52] U.S. Cl. ........................................ 99/453; 99/462; 426/36; 426/506; 426/519; 99/483
[58] Field of Search ................. 99/348, 352, 355, 452, 99/453, 459, 460–463, 483, 516; 425/208, 209, 378 R; 259/192–193; 426/36, 506, 519, 582

[56] References Cited

U.S. PATENT DOCUMENTS

| 3,531,297 | 9/1970 | Kielsmeier | 426/36 |
| 3,580,161 | 5/1971 | Pontecorvo | 99/453 |
| 3,592,124 | 7/1971 | Pontecorvo | 99/453 |
| 3,713,220 | 1/1973 | Kielsmeier | 99/459 |
| 3,841,610 | 10/1974 | Hanzawa | 259/193 |
| 3,907,259 | 9/1975 | Leclercq | 259/192 |

FOREIGN PATENT DOCUMENTS 1,082,536 . 9/1967 United Kingdom ................ 425/208

Primary Examiner—Harvey C. Hornsby
Assistant Examiner—Robert Pous
Attorney, Agent, or Firm—Sughrue, Rothwell, Mion, Zinn and Macpeak

[57] ABSTRACT

A vertical hopper carries a mass of hot water recirculated therethrough by water jet inlets opening laterally into the vertical hopper below the level of accumulated water and creates by water turbulence the heating and mixing of cheese curd segments as they pass under gravity through the water towards a pair of intermeshed, slow speed augers within a horizontal discharge duct which underlies the hopper. The augers feed the uniformly mixed stretched cheese curd through an elbow to a vertical accumulating duct bearing at its upper end an adjustable back pressure plate which closes off a part of the accumulator duct discharge opening.

3 Claims, 5 Drawing Figures

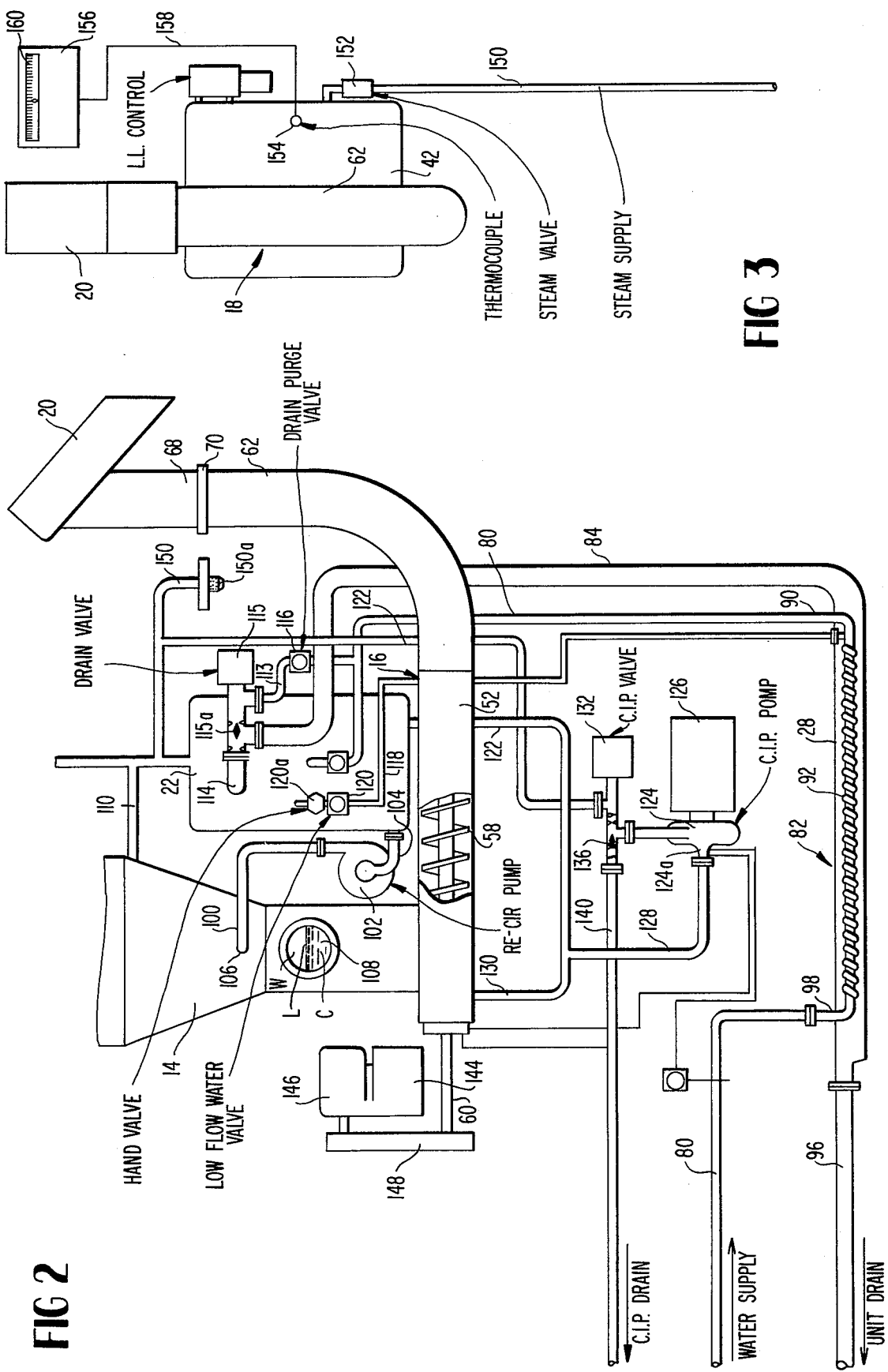

PASTA-FILATA CHEESE MIXING AND STRETCHING MACHINE

BACKGROUND OF THE INVENTION

FIELD OF THE INVENTION

This invention relates to an apparatus or machine for mixing and stretching of cheese curd, and more particularly, to a machine for insuring uniform stretching and mixing of Italian pasta-filata cheese for use in the manufacture of pizza and the like.

In recent years, mixing and stretching machines have been developed for mixing cheese curd in contact with heated water and incorporating an elongated motor driven auger for reciving the mixed cheese curd and for stretching the cheese curd during conveying of that curd from the hopper to a vertical accumulator duct at the discharge end of the auger. Such an apparatus forms the subject matter of U.S. Pat. No. 3,713,220 issuing Jan. 30, 1973, to Lester O. Kielsmeier and James G. Leprino. In order to heat the curd during its contact with the water within the hopper initially receiving the cheese curd particles, the apparatus of the referred to patent injects steam directly into the curd water to maintain a given temperature for the water and thus for the curd during mixing and prior to movement through the auger. While the apparatus of the referred to patent constitutes an improvement in the art of manufacturing various types of pasta-filata cheese which are employed in general use in making pizza, there is still great difficulty in developing a good consistent cheese having desired stretchability and uniformity in content. Many of the pizza cheeses which may be purchased in the market today such as mozzarella or provolone cheese have the detrimental characteristics such as bleeding, that is, the fat bleeds out of the cheese, and the stretchability is insufficient such that the cheese does not function right when placed on a pizza Normally, it will not spread evenly and/or has a tendency to burn. It is highly important that a mozarella cheese have the properties of melting uniformly to cover the pizza and to stretch or string on the pizza without burning or turning brown or black. With respect to the obtaining of a mozzarella or provolone cheese having the desired characteristics noted above, the known machines such as those operating under the principles of the referred to patent, have two deficiencies: First, the auger drive speed is excessive and tends to run the cheese through the machine much too fast. The effect of moving the cheese at too rapid a rate defeats the need for the cheese curd to reach a specific temperature and be held at that temperature for a period of time prior to reaching the augers and passing therethrough. Moving the cheese from the water filled hopper where it is subjected to agitation, uniform heating and some stretching at too fast a rate removes the cheese without effecting uniform heating and mixing, and further has a detrimental effect on the utilization of the aguers whose function is not only to remove the cheese from the hot water bath, but to stretch it in accomplishing that end. Thus, the function of the auger is not purely to convey the cheese but to effect its conveyance with sufficient resistance to insure uniform mixing of the cheese and stretching it prior to discharge from the auger.

In the aforementioned patent, back pressure was placed on the cheese curd as it moves through the duct surrounding the auger and leading horizontally from the bottom of the hopper to the vertical cheese accumulator duct or pipe. Back pressure was achieved by the incorporation of a transverse, obliquely inclined plate which narrows the auger duct in a direction away from the hopper and by the utilization of a disc on the auger shaft at its discharge end which limits the cross sectional area of the auger discharge. This results in the narrowing of the pipe or duct carrying the auger, places the restrictor in the vicinity of the auger, limits the back pressure to a small mass of cheese fully within the auger and interferes with stretching and also the removal of manufactured cheese at the termination of a production run such as at the end of the day and in the cleaning of the cheese mixing and stretching machine. Further, the injection of steam or a combination of steam and air under pressure into the hopper to obtain agitation of the water and heating of the same increases the time-temperature requirements for insuring maximum mixing and stretching of the cheese prior to being further stretched and transported by way of the extruder to the vertical accumulator duct.

SUMMARY OF THE INVENTION

The present invention is directed to an improved Italian cheese curd mixing and stretching machine of the type including a vertical hopper supporting a mass of water through which portions of Italian cheese curd are vertically dropped for gravity movement to an underlying auger carried by horizontal discharge duct terminating in a vertical accumulator duct at the discharge end of the auger mechanism. In the machine of the present invention, hot water is recirculated by injecting the water from a recirculation pipe into the vertical hopper below the level of accumulated water through transversely opposed water inlet injection nozzles on opposite sides of the vertical hopper to cause water turbulence and the incorporation of outlet openings within the sides of the vertical hopper above the water injection nozzles to effect counterflow movement of the water within the hopper with respect to the cheese curd segments passing by gravity from the top of the hopper to the hopper bottom. A horizontal discharge duct underlying the bottom of the hopper sealed to the hopper and open thereto carries a pair of intermeshed augers. Means are provided for driving the augers at slow speed to stretch and further mix the accumulated cheese curd within the horizontal duct and to force the stretched and mixed cheese curd to flow through an elbow at the discharge end of the horizontal duct to a vertical accumulator duct terminating in a cheese discharge head. The machine includes means for supplying make up water and for removing a portion of the recirculated water to the hopper to maintain the proper ph of the water within the hopper. A back pressure plate within the discharge head at the upper end of the accumulator duct and remote from the augers overlies a portion of the accumulator duct discharge opening for maintaining a back pressure on the cheese throughout the accumulator duct, the elbow, the intermeshed augers, and the horizontal duct. The discharge head may comprise a rectangular tubular duct fitted to the end of the vertical accumulator duct and inclined with respect to the duct vertical axis. The discharge head inclines downwardly and away from the vertical accumulator duct such that the accumulator duct opens to the interior of the discharge head by way of an oval opening oblique to the accumulator duct axis and the back pressure plate comprises a flat rectangular plate with an arcuate notch on the transverse edge overlying the oval opening whose notch diameter is less than that of the vertical accumulator duct.

BRIEF DESCRIPTION OF THE DRAWINGS

FIG. 2 is a hydraulic schematic view of the machine of FIG. 1.

FIG. 3 is a schematic view of the machine of FIGS. 1 and 2 showing the steam supply arrangement for heating the water being recirculated within the machine.

DESCRIPTION OF THE PREFERRED EMBODIMENT

Figure 1:
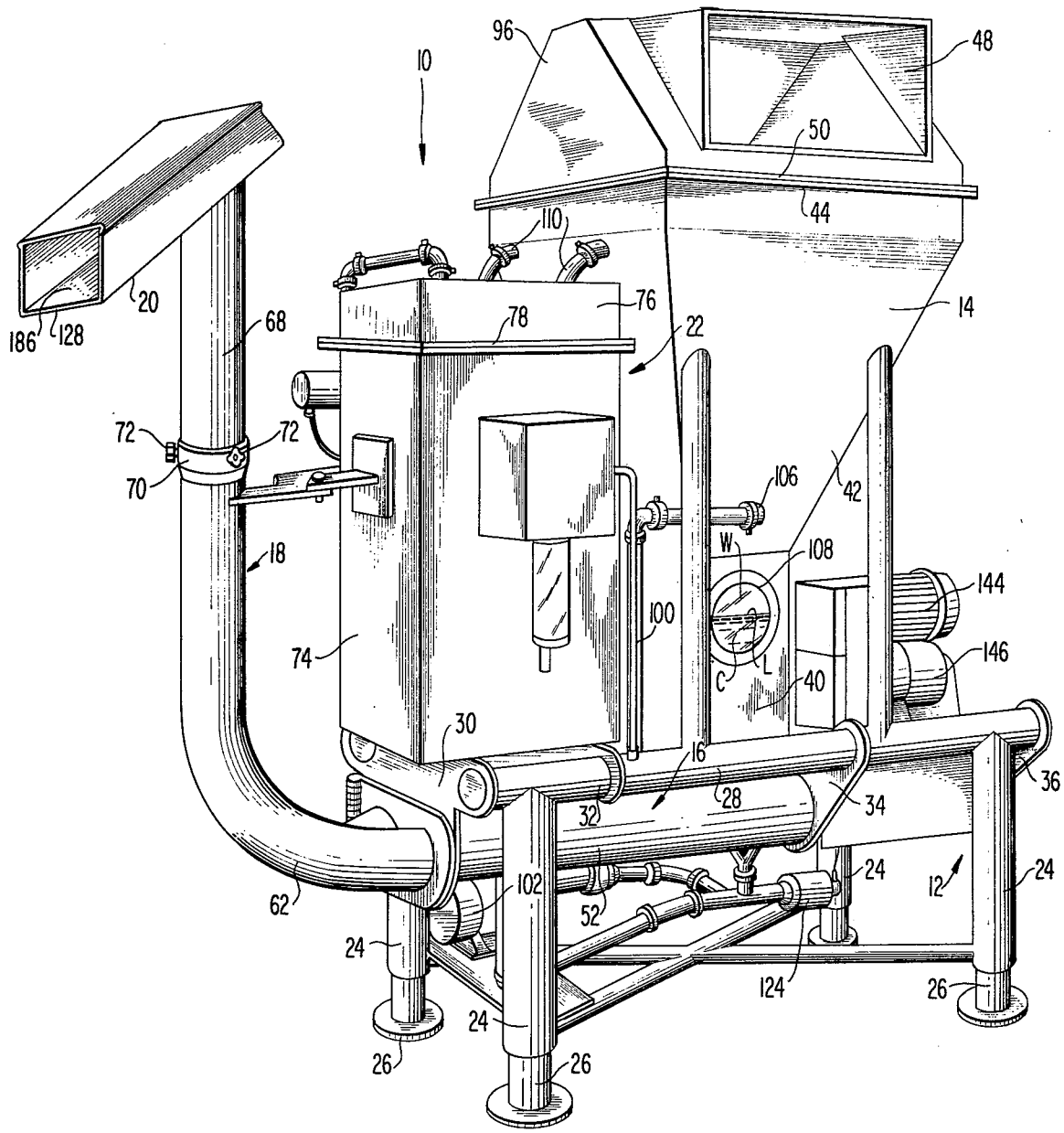
FIG. 1 is a perspective view of the improved pasta-filata cheese mixing and stretching machine of the present invention.

An improved cheese curd mixing and stretching apparatus is illustrated generally at 10, with the major components of the machine illustrated in FIG. 1 as comprising a feed hopper or tank 14 in which hot water heats and mixes the cheese curd, hopper 14 being supported by an open framework indicated generally at 12 formed of hollow metal piping, the hopper overlying and being in open communication with a horizontal duct carrying auger assembly 16 which forces the mixed and stretched cheese to move into a vertical accumulator duct 18 which discharges cheese through an oblique or inclined discharge head 20. The machine further incorporates a hot water make-up and recirculating control tank 22. These components of the machine are preferably formed of stainless steel sheet metal or the like, with the exception of the open frame 12 which may be formed of welded pieces of extruded metal tubing such as stainless steel. In that respect, the open frame 12 comprises four vertical posts 24 supported on adjustable height pads 26 so that the open frame may be leveled, the posts being joined principally by longitudinally extending horizontal pipes 28 and joined transversely by bulkheads or plates 30, 32, 34 and 36. Cross bars 38 which may be in the form of hollow tubes extend obliquely between the corner posts 24, all of these components being welded together to form a substantially rigid frame.

Further, since the horizontal conduits or tubes 28 are hollow, they function as liquid passages or liquid manifolds. The hopper or tank 14 comprises a vertical, rectangular vertical discharge duct section 40 fixed to the open frame 12 at its lower end and supporting at its upper end a downwardly converging hopper section 42, the hopper section 42 terminating at its upper end in a horizontal flange 44. The hopper section 42 which is of rectangular horizontal cross-section supports hood 46 within which is provided a hopper fill opening in the form of a rectangular window 48 on one side thereof, and terminates in its lower edge in a flange 50 sized to flange 44 of hopper section 42 and being mounted thereto. These sections may be coupled together by bolts or the like.

Supported by the transverse bulkheads 30 and 34 is auger assembly 16. Auger assembly 16 comprises a double tube casing 52 forming the horizontal hopper discharge duct, that is, two annular casing portions which extend parallel to each other and intersect to form a hollow interior cavity receiving a pair of intermeshed helical augers 58 mounted to auger shafts 60. The shafts are mounted for rotation about parallel axes within casing 52 and act to force the cooked cheese curd discharging from the hopper vertical discharge duct section 40 to move from left to right in FIG. 2, and from right to left in FIG. 1, to elbow 62 at the lower end of the cheese accumulator duct 18. The elbow 62 is mounted to a vertical door 64 which is hinged at 66 to transverse bulkhead 30, forming a part of the open frame 12 for pivoting about a vertical axis. Elbow 62 is preferably formed integral with the lower section of the accumulator duct 18. An upper section 68 of the accumulator duct is detachably mounted, by way of collar 70, to the upper end of the elbow 62. The lower end of section 68 fits within the collar 70 and is held therein by means of a plurality of set screws 72. Mounted on the top of the transverse bulkheads 30 and 32 is the water make-up chamber 22 which constitutes a rectangular metal container 74 with a rectangular cover 76 fixed to the upper end of the same by a flanged connection at 78.

The schematic hydraulic representation of FIG. 2 more clearly illustrates the arrangement for controlling the recirculation and heating of water for the cheese feed hopper or tank 14 and bleeding off of a portion of that water and adding fresh water to prevent the ph of the recirculated water from becoming too low as it leaches acid from the cheese. In that respect, a water supply pipe or conduit 80, FIG. 2, feeds water through a regenerative heat exchanger indicated generally at 82 which conveniently employs one of the horizontal pipes 28 of open frame 12 as a flow conduit for drainwater being drained from the water make-up chamber or tank 22 through conduit 84 leading from the water make-up chamber 22 and discharging to a unit drain via pipe or conduit 86 downstream of the manifold pipe 28. In turn, the water supply pipe 80 enters the regenerative heat exchanger or pre-heater 82 by passing through the side of the manifold pipe 28 at 88 and exiting at 90, the water supply pipe leading to the water make-up chamber or tank 22. Appropriately, an electrical resistance heater 92 may be wound about a portion of the pipe 80 within the regenerative heat exchanger 82, such that water entering the make-up tank 22 may be pre-heated by energization of the electrical resistance heater 92 or by counterflow movement of the water draining from pipe 84 at the overflow of the make-up tank 22 or by both. In this respect, the water within the water make-up tank 22 is recirculated through the cheese curd feed hopper or tank 14 by means of a pair of water inlet pipes or conduits 100 which lead from a recirculation pump 102 whose suction side is connected by way of pipe or conduit 104 to the side of tank 22, and at the bottom thereof. The pipes 100 are directed to opposite sides of the tapered hopper section 42, conduits 100 opening to the interior of the tapered hopper section 42 above the vertical discharge duct section 40 on diametrically opposite sides of the hopper section 42, through relatively high velocity water inlet injection nozzles 106 causing water jets to penetrate the mass of water and cheese curd within the hopper section 42 so as to create a relatively high turbulence at the point where the sections of cheese curd fall by gravity through the hopper section where they are heated, partially mixed, and stretched. Cheese curd accumulates to a level L, the cheese being indicated at C and the water above the cheese at W. While the level L of the cheese accumulating above the augers 58 may vary, it is preferred that the level be within the sight glass 108, and while the cheese C is added continuously as it is being extruded from left to right, FIG. 2, for accumulation within accumulator duct 18 and while the level further varies with the velocity of rotation of augers 58, this level may be readily changed by varying the rate of introduction of the sections of cheese curds through hopper fill opening 48 into the hopper section 42 for passage downwardly through the water W maintained within the hopper 14.

At some level above the water inlet pipes 100, there are provided a pair of water outlet pipes 110 connected to hopper section 42 well above the water injection nozzles 106, and in this regard, the flow of cheese as it moves by gravity through the water accumulating within the hopper section, is counter to that of the water which enters through the pipes 100 and exits through the outlet pipes 110. The outlet pipes 110 return water to the top of the water make-up tank 22 such that the mass of water is continually recirculated while a portion of fresh water is added by way of the regenerative heat exchanger 82, and a like portion is drained from the make-up tank 22. In that regard, the water supply pipe 80 opens to the side of tank 22 by way of a solenoid operated high velocity flow water valve 112. A diversion pipe 113 fluid connects the water supply pipe 80 to a water drain manifold 114 which also opens to the interior of tank 22 at a point much higher than that of the water supply pipe 80. A drain purge valve 116 within pipe 112 permits fresh water to flush the interior of the drain manifold and drainpipe 84 leading to the regenerative heat exchanger 82. Valve member 115a controlled by drain valve 115 shifts to the left, forcing purge water to flow from line 113 to line 84. Another pipe or conduit 118 opens into the tank 22 at a point above pipe 80, the pipe 118 leading directly from water supply pipe 80 at regenerative heat exchanger 82 and permitting water to flow at low velocity through the relatively small diameter conduit 118 into the side of tank 22 under control of the solenoid operated low velocity flow water valve 120. Hand valve 120a controls metering of make-up water. Further, a conduit or pipe 120 leads from the bottom of the make-up tank 22 to the C. I. P. pump 124 driven by C. I. P. pump drive motor 126. Pump 124 constitutes a centrifugal pump whose inlet 124a is connected by a pipe or conduit 128 to drain conduit 122 leading from the water make-up tank 22 and to a line or conduit 130 connected to the casing 52 of auger assembly which may be drained or recirculated back to the water make-up tank 22. A C. I. P. valve 132 controls flow of water through pipe 134 to the top of the make-up tank 22 by means of a connection common with the outlet pipes 110 for hopper section 42. Laterally shitable valve member 136 within pipe 140 connected to the C. I. P. pump 124 by way of pipe 138 controls the flow of water to the C. I. P. drain pipe 140 or by way of conduit 134 back to the top or inlet side of the make-up tank 22 under energization of C. I. P. solenoid valve 132. The paired augers 58 are driven in opposite directions by an auger drive motor 144 through a speed transmission system 146 and a chain drive unit 148 which directly drives shafts 60 supporting the augers. The transmission 146 acts to reduce the speed of the drive motor 144 and to cause the augers 48 to rotate relatively slowly so as to insure final mixing and complete stretching of the cheese prior to accumulation of the same within vertical accumulator pipe or duct 18. Pipe 150 leads to nozzle 150a to permit cleaning of elbow 62, draining to line 130.

While a portion of the water is removed from circulation between tanks 14 and 22 through a main liquid loop constituted by tank 22, curd feed hopper or tank 14, recirculation pump 102 and conduits 104, 100 and 110, and while the fresh water introduced through the regenerative heat exchanger 82 is preheated by either resistance heater 92 or the draining of a limited portion of the water being recirculated or both, it is desirable to inject live steam into the bottom of the hopper section 42 so that the steam heats the water and in turn the water heats and mixes the cheese curd as it drops through the water by gravity, while turning and twisting the cheese curd sections and by partially stretching the cheese curd by the agitation of the water due to the injection of water at relatively high velocity by way of nozzles 106 on opposite sides of the hopper section 42. By reference to FIG. 3, it may be seen that a steam inlet pipe 150 supplies steam to the hopper section 42 through a steam valve 152 under control of a thermocouple 154 which is mounted to the hopper section 42 and penetrates the interior of the same to measure the water temperature of the water W being recirculated. As the temperature drops, more steam is injected directly into the water at hopper 14 to heat the same which in turn heats the incoming cheese entering the hopper fill opening 48 of tank 14. The thermocouple 154 may control the steam valve 152 directly, or lead to a display instrument indicated at 156; thermocouple 154 supplying an electrical signal through line 158 to thus indicate specifically the temperature of the water on scale 160 and the operator may, if desired, manually adjust steam valve 152 to vary the heat. In this respect, the temperature of the cheese being introduced to the machine through the hopper fill opening 48 will, for example, vary from 140° to 111° F. This is at some temperature above room temperature and constitutes the process temperature for making cheese in the bath (not shown) just prior to introduction of the cheese curd sections into the water filled hopper section 42 of the machine. The cheese curd, which may be introduced into the hopper fill opening 40 by an inclined conveyor belt (not shown), is in the form of a semi-elastic mass, it being milled into small strips about ¾ inch wide by 1 inch by 8 or 9 inches in length and simply dropped by the conveyor into the converging hopper section 42 through window or opening 48. During the downward passage by gravity through the water W, which is subject to agitation, the small strips of the semi-elastic cheese curd are in direct contact with the hot water to insure that the product is uniformly heated and also to wash out some of the acidity which is natural to the cheese. With the counterflow movement of the water and the agitation of the water by way of the hot water jet nozzles 106, a time temperature action takes place within the tank 14, causing uniform heating of the cheese, some stretching and mixing of the cheese, acid leaching of the same prior to its accumulation to level L within the trough or duct 40 as evidenced at C, FIGS. 1-2, the cheese level L being normally kept somewhere between the bottom and the top of the sight glass 108, this insuring that the machine is adequately loaded with cheese and the cheese is adequately heated and that a sufficient supply exists on the inlet side of the augers 58. While the augers 58 will pick up any amount of cheese accumulating within the bottom of the duct section 40, it is required that the cheese be uniformly heated, and this mostly occurs within the hopper, not within the horizontal duct 52. Initially, the water through which the cheese passes is clear. However, as the day goes on, and due to the recirculation of the water, the water continues to accumulate butterfat and other solids. The ph of the water would become excessively low unless some of the water was removed and fresh water added to that recirculating by way of recirculation pump 102.

As an example, approximately two gallons a minute of water may be removed from the recirculation loop and approximately the same amount may be added as fresh water preheated by way of the regenerative heat exchanger 82 within the make-up tank 22.

In the operation of the present cheese mixing and stretching machine, the rotative speed of the intermeshed augers 58 is not only important in insuring in terms of the time-temperature requirements for effective mixing, stretching and uniform heating of the cheese, but for effective cheese stretching by action of the intermeshed helical augers, the augers must work against a resistance, and the resistance must be remote from the discharge end of the augers. An important aspect of this invention therefore resides in the specific construction of the discharge head and the adjustable back pressure plate incorporated within that head 20. By reference to FIGS. 4 and 5, the details of this structural assembly may be readily seen.

Figure 4:
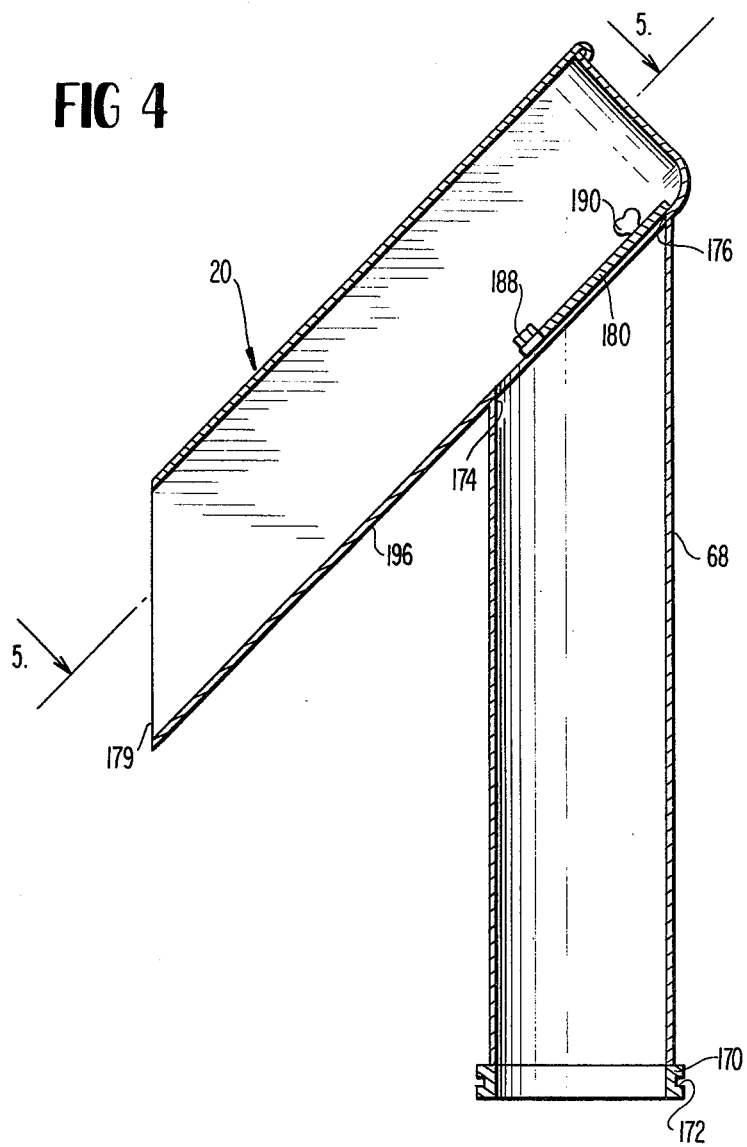
FIG. 4 is a sectional elevational view of a portion of the accumulator duct and the improved discharge head of the machine of FIG. 1.
Figure 5:
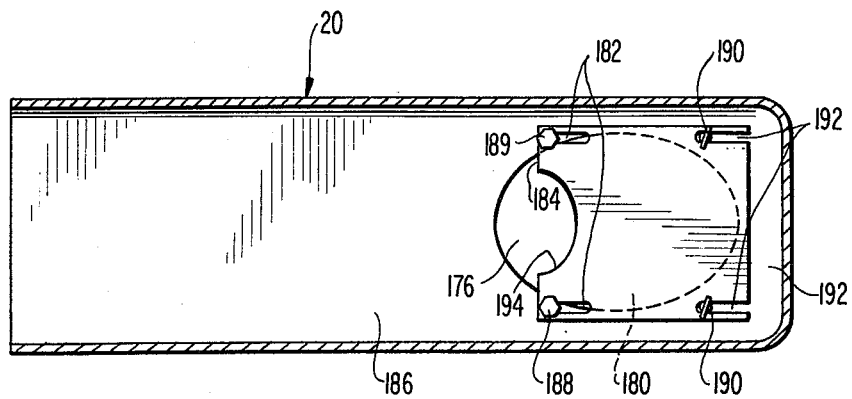
FIG. 5 is a sectional view of the discharge head of FIG. 4 taken about line 4—4, illustrating the back pressure plate.

The upper section 68 of the accumulator duct 18, as mentioned previously, comprises a hollow stainless steel tube terminating at its lower end in an enlarged diameter flange 170, FIG. 4, carrying a circumferential groove 172 which receives the threaded ends of the set screws 72, permitting the upper accumulator tube section 68 to be detachably locked within collar 70 carried by elbow 62. The upper end of the accumulator tube section 68 is cut at an oblique angle forming an oval opening 174, and welded to the upper end of tube section 68 is the discharge head 20. The discharge head 20 comprises a duct or tube of rectangular cross-section provided with an oval opening 176 within the bottom of that member matching the opening 174 of duct section 68, the two parts 20 and 68 being appropriately welded or soldered to each other. The discharge head 20 therefore angles downwardly and away from the accumulator duct section 68. Its lower end 178 is open, permitting the mixed and stretched cheese to discharge as it accumulates within the accumulator duct 18 and rises above the level of opening 174 within the upper end of the duct section 68.

In the embodiment of the invention as illustrated, back pressure is applied against the cheese accumulating within the accumulator duct 18 at a point remote from the augers 58 by the utilization of a flat back pressure plate 180 which is generally of rectangular configuration, is provided with four elongated slots 182 adjacent respective corners and has one edge 184 which extends transversely across the oval opening 176 within its bottom wall 186. Preferably, two screws 188 are threaded to the bottom wall 186 of the discharge head, project through slots 182 adjacent edge 184, and act as fixed guides for shifting of the back pressure plate 180 relative to the major axis of the oval opening 176 within the discharge head. Additionally, a pair of wing screws 190 are threaded to the bottom wall 186 of the discharge head in line with the fixed screws 188 and are received respectively within the other two elongated slots 182 extending inwardly from edge 192 of the back pressure plate 180. The heads of the screws 188 are sufficiently displaced from the bottom wall 186 of the discharge head that the plate may move freely with respect to those two screws, conversely the wing screws 190 are backed off until the back pressure plate 180 is free to slide with respect to both sets of screws and the plate is shifted longitudinally so that the plate covers more or less of the oval opening 176 within the bottom wall 186 of the discharge head. With the plate 180 positioned properly, relative to the rotational velocity of the augers 58, the wing or butterfly screws 190 are screwed inwardly to forcibly clamp the plate against the bottom wall 186, thereby fixing the location of that plate with respect to the discharge head. Preferably, the plate 180 includes a shallow curved recess or notch 194 within edge 184 which traverses across opening 176 to define an irregular accumulator duct discharge opening for the passage of manufactured cheese; the cross-sectional area of the discharge opening formed thereby being considerably less than the cross-sectional area of the accumulator duct leading to the discharge head. Thus, a mass of cheese is stored between the back pressure plate 180 and the discharge end of the augers 58 during machine operation.

With this assembly, the large volume pipe or accumulator duct 18 acts to accumulate a relatively large mass of cheese, giving the cheese more time to knit together and become uniform in content. Further, with the restrictor or back pressure plate 180 within the head 20, the plate can be removed, the augers speeded up, the cheese can be rapidly removed from the discharge head as it discharges from the oval opening 174 of pipe or tube section 68, after all of the cheese is removed from the auger assembly 16 and is within the accumulator duct 18, that duct can be broken down by loosening set screws 72 and removing section 68 and at the same time the elbow 62 can be swung away from the auger assembly 16 by the hinged plate or door 64 for ready access and removal of the cheese and cleaning of the components.

While the invention has been particularly shown and described with reference to a preferred embodiment thereof, it will be understood by those skilled in the art that various changes in form and details may be made therein without departing from the spirit and scope of the invention.

· What is claimed is:

1. A pasta-filata cheese curd mixing and stretching machine comprising:
   a vertical hopper carrying a mass of water and having an opening at its upper end for receiving cheese curd sections for vertical movement under gravity through the water,
   a horizontal discharge duct underlying said hopper and forming an extension thereof,
   an auger assembly comprising: intermeshed helical augers mounted for rotation about a horizontal axis within said discharge duct and being open to the hopper interior for receiving accumulated cheese curd and for forcing the cheese curd to move horizontally through a discharge duct surrounding said augers while stretching the cheese curd during transport,
   an accumulator duct extending vertically above the auger assembly and coupled to the discharge end of the auger assembly discharge duct,
   means for recirculating water through said hopper, said hot water recirculating means including at least one pair of water injection nozzles opening into said hopper from opposite sides at a lower end thereof, at least one water overflow pipe mounted to said hopper above the level of said water injection nozzles for removing water from said hopper, a make-up tank receiving the water from said overflow pipe and supplying hot water to said water injection nozzles, a pump coupled to said make-up tank between said make-up tank and said water injection nozzle means, means for removing a portion of the water from said recirculation circuit and for supplying fresh water thereto, a drive motor for said augers, a low speed transmission means coupling said motor to said augers for rotating said augers at relatively low speed, and a back pressure plate mounted on the discharge end of said vertical accumulator duct and at a position sufficiently remote from said augers for maintaining a back pressure on the cheese curd accumulating within said vertical accumulator duct to insure complete stretching of said cheese curd and uniform mixing of the same during transport by said augers from said hopper.

2. The cheese curd mixing and stretching machine as claimed in claim 1, wherein said accumulator duct terminates at its upper end in an oblique oval discharge opening, an inclined discharge head mounted to said accumulator duct, said discharge head comprises a rectangular duct including a flat bottom wall, an oval opening within the discharge head bottom wall corresponding to the oval opening formed by the oblique upper end of said accumulator duct, and said back pressure plate comprises a flat, generally rectangular plate slidably mounted on the bottom wall of said discharge head and partially covering the aligned oval openings within the discharge head bottom wall and the discharge opening of said accumulator pipe.

3. The cheese curd mixing and stretching machine as claimed in claim 2, wherein said back pressure plate includes an arcuate notch on the transverse edge which overlies the oval opening within the discharge head bottom wall, said back pressure plate further comprising elongated slot means along both sides, extending parallel to the major axis of the oval opening within said discharge head bottom wall, and said discharge head further comprises screws threaded to said bottom wall and carried within said elongated slot means; whereby, loosening of the screws permits said back pressure plate to be shifted longitudinally relative to the bottom wall of said discharge head to vary the size of the discharge opening formed by the oval opening within the bottom wall of the discharge head and the transverse edge of said back pressure plate which overlies that oval opening.

* * * * *